United States Patent
Raikar et al.

(10) Patent No.: US 8,065,368 B2
(45) Date of Patent: Nov. 22, 2011

(54) CONFIGURING TEMPLATES FOR AN APPLICATION AND NETWORK MANAGEMENT SYSTEM

(75) Inventors: Amit Raikar, Sunnyvale, CA (US); Guruprasad Ramarao, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2179 days.

(21) Appl. No.: 10/632,446

(22) Filed: Jul. 31, 2003

(65) Prior Publication Data
US 2005/0027835 A1   Feb. 3, 2005

(51) Int. Cl.
*G06F 15/16* (2006.01)
(52) U.S. Cl. .................. 709/206; 709/222; 709/223
(58) Field of Classification Search .......... 709/206, 709/222, 223
See application file for complete search history.

(56) References Cited

U.S. PATENT DOCUMENTS

| 6,766,364 B2* | 7/2004 | Moyer et al. .................. 709/221 |
| 6,957,348 B1* | 10/2005 | Flowers et al. ................ 726/23 |
| 2003/0188189 A1* | 10/2003 | Desai et al. .................... 713/201 |

* cited by examiner

*Primary Examiner* — Kyung H Shin (57) ABSTRACT

Methods and Systems for configuring secure templates for an application and network management system to provide network security. A template for an application and network management system is configured with first information for determining whether at least one message received by the template should or should not be processed by the template. The template is configured with second information for processing data associated with at least one received message. The template is configured with third information for preventing the communication of at least one received message to other templates for the application and network management system.

19 Claims, 3 Drawing Sheets

CONFIGURING TEMPLATES FOR AN APPLICATION AND NETWORK MANAGEMENT SYSTEM

RELATED APPLICATIONS

This application is related to U.S. application Ser. No. 10/360,883 entitled "A Method and System for Preventing Unauthorized Action in an Application and Network Management Software Environment" by Amit Raikar and Guruprasad Ramarao and assigned to the assignee of the present invention filed on Feb. 6, 2003, the contents of which are incorporated herein.

TECHNICAL FIELD

Embodiments of the present invention relate to managing networks. More specifically, embodiments of the present invention relate to configuring application and network management systems to provide security for devices and/or applications associated with networks.

BACKGROUND ART

With the advent of distributed networking systems, there has been a growing need for systems that manage (referred to hereinafter as "management systems") the devices (referred to hereinafter as "nodes") of networks and applications (referred to hereinafter as "agents") that may run on those devices. A managed system may include, among other things, the nodes and agents the system manages and a server (referred to hereinafter as a "management server") that manages the nodes and agents.

Examples of nodes include operating system based computers that are capable of running agents (referred to hereinafter as "operating systems based nodes") and devices, such as routers, firewalls, load balances, that are not capable of running agents (referred to hereinafter as "non-operating systems based nodes"). Since the agents on "operating systems based nodes" not only send information about the system but can also actively and flexibly manage the nodes, the operating systems based nodes with agents are referred to hereinafter as "managed" nodes. On the other hand, even though "non-operating systems based nodes" also send information about the system, for example using SNMP, the amount of flexibility in managing the system is limited; hence the non-operating systems nodes are also known as "external" nodes, even though they may be managed indirectly, as will be described in more detail.

Examples of managing include, among other things, determining whether processes, nodes, and/or agents are running, how much memory a node has, the Computer Processing Unit (CPU) utilization of the node, whether a firewall has been intruded, correlating received messages either on the agent or the management server side to determine that a firewall has been intruded and taking action based on these determinations. Examples of taking action may include, among other things, adding more memory to a node, re-balancing a workload, or terminating reception of communications from a network behind a firewall that is failing.

One such application and network management system is Hewlett Packard's Openview Operations (OVO). Typically, in OVO, the nodes and/or agents associated with the application and network monitoring system communicate, directly or indirectly, information about their status with a management server. The server uses the communications to manage the nodes and/or agents associated with the network. For example, an agent executing on a particular managed node may generate a message including information about the status of the agent or the node the agent is running on. Similarly, a non-managed node may generate an SNMP trap (the term "messages" shall be used hereinafter to refer to, among other things, messages, which are generated with Application Programming Interfaces (APIs), opcmsg, or opcmon, events, alerts, Simple Network management Protocol (SNMP) traps, and system logs). An interceptor, also running on the node, receives the message (referred to hereinafter as a "received message") and analyzes the received message with a template. Applications may be configured to be agents by associating templates and interceptors with the applications.

Typically a network administrator distributes templates to the various nodes that are being managed within a particular management system. Usually, templates are configured by more than one person or by more than one group of people. For example, application developers know more about the agents and network administrators know more about networks. Therefore, the applications developers may initially configure the templates based on the application developers' knowledge of their applications. Then network administrators may modify the templates or add templates based on their knowledge of networks and distribute the templates to the appropriate nodes.

One problem with configuring templates is that developers have varying knowledge about security in general and about other agents. For example, since the developer of application A on an agent does not know the code of application B on the same agent, the developer of application A may develop templates that create messages that will be received by the templates associated with application B (referred to herein as "proliferation of messages").

Another problem with configuring templates is the complexity involved in configuring the templates. Furthermore, there is a lack of expertise on the part of people configuring the templates. For example, frequently network administrators and/or application developers try erroneously to configure the templates as openly as possible. This may result in inappropriate actions being performed, either by mistake or owing to malicious intent.

An example of one inappropriate action is removing directories on a node that did not request the action. In this case, a user on node A creates a message requesting that a yet unspecified action be performed on node B. A template on node A intercepts the message and appends a request for an action, such as the deletion of directories. The message is forwarded to the server. Since the message designates that the action should be performed on node B, the server forwards the message to node B. Since the message is from the server, node B assumes that it has to perform the action and deletes all of its directories. As can be seen, a malicious user may use this inappropriate action to delete directories on a node the user is not even allowed access to.

In the above example, node A is an example of a "local node" because it is the node that requested, by creating the message, to delete the directories. Node B is an example of a "remote node" because it is not the node that requested the deletion of its directories. The deletion of the directories is an example of a "remote action" because the action of deleting directories was performed on a remote node. A "target node" is the node that an action is performed on. In this case, Node B is the target node. However, if the action had been performed on Node A, then Node A would have been the target node. Further, if the Node A's directories had been deleted, then the action would have been a "local action" because the action would have been performed on the local node. As the agent runs with root type of privileges and the message received by the agent can be created by a non-privileged user, even local actions may be used with malicious intent, for example, by getting around user account privilege enforcement mechanisms.

Another example of an inappropriate action is the proliferation of messages (also known as a "message storm"). In this case, an improperly configured template erroneously generates messages based on received messages.

The Advance Network Security (ANS) module may be used for securing the communications aspect of an OVO based solution. ANS may be used to assure that only authenticated agents communicate with an authenticated server, and the traffic between them meets integrity and confidentiality requirements. However, ANS does not address the problems already described herein.

For these and other reasons, a method and/or a system that provides security for a network would be valuable. Further a method and/or system that increases overall performance of a network would also be of value. A further a method and/or a system that provides enhanced usability and robustness of a application and network management system would also be of value.

DISCLOSURE OF THE INVENTION

The present invention increases security for a network, and applications on that network. The present invention provides increased overall performance of a network and the nodes on that network. The present invention provides enhanced usability and robustness of a management system.

Embodiments of the present invention pertain to methods and systems for configuring secure templates for an application and network management system is described. In one embodiment, a template for an application and network management system is configured with first information for determining whether at least one message received by the template should or should not be processed by the template. The template is configured with second information for processing data associated with at least one received message. The template is configured with third information for preventing the communication of at least one received message to other templates of the application and network management system.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Hardware Overview

Figure 1:
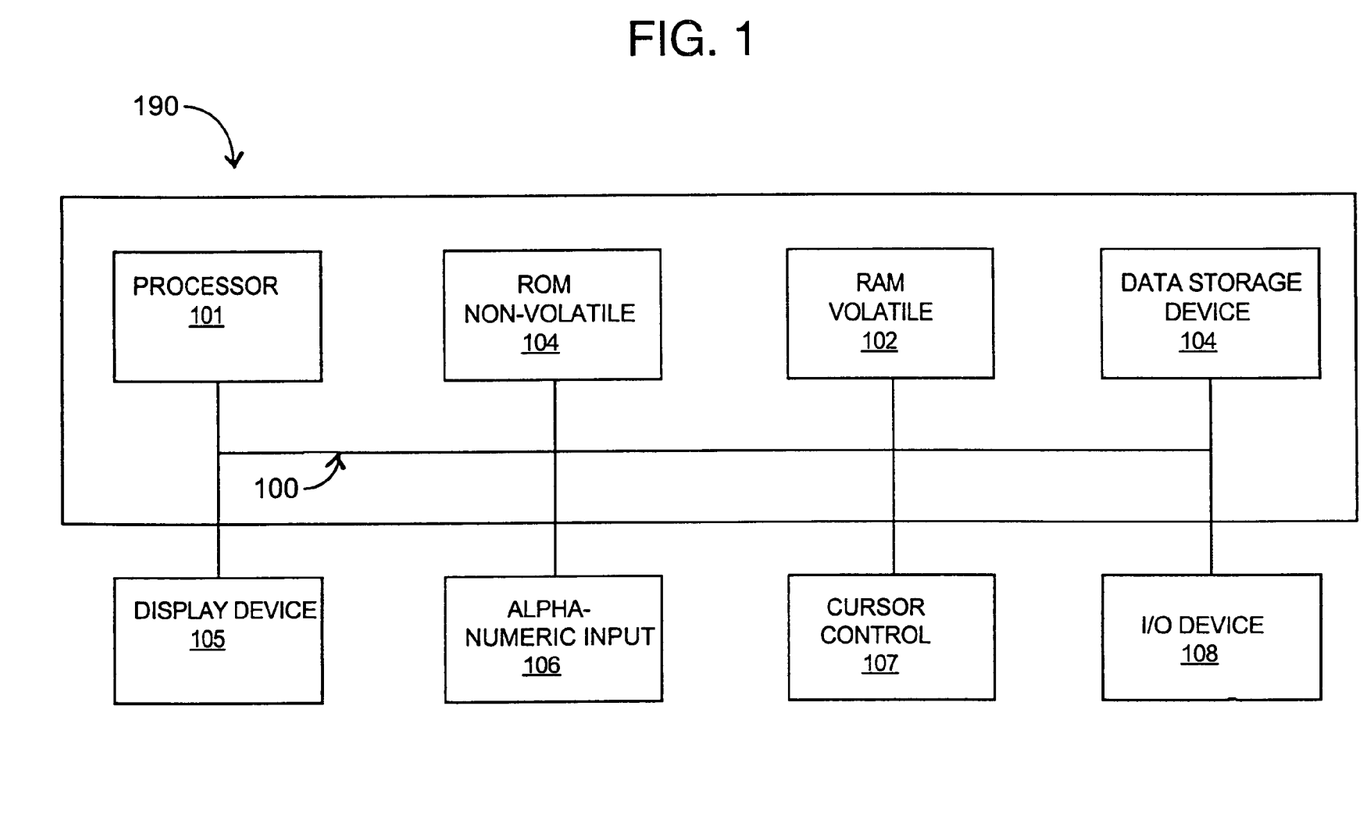
FIG. 1 is a block diagram of an exemplary computer system upon which embodiments of the present invention can be implemented.

FIG. 1 illustrates an exemplary computer system 190 upon which embodiments of the present invention may be practiced. In general, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled with bus 100 for communicating information and command selections to processor 101, and an optional user input device such as cursor control device 107 coupled to bus 100 for communicating user input information and command selections to processor 101. Furthermore, an optional input/output (I/O) device 108 is used to couple computer system 190 onto, for example, a network.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Software System and Functional Overviews

Figure 2:
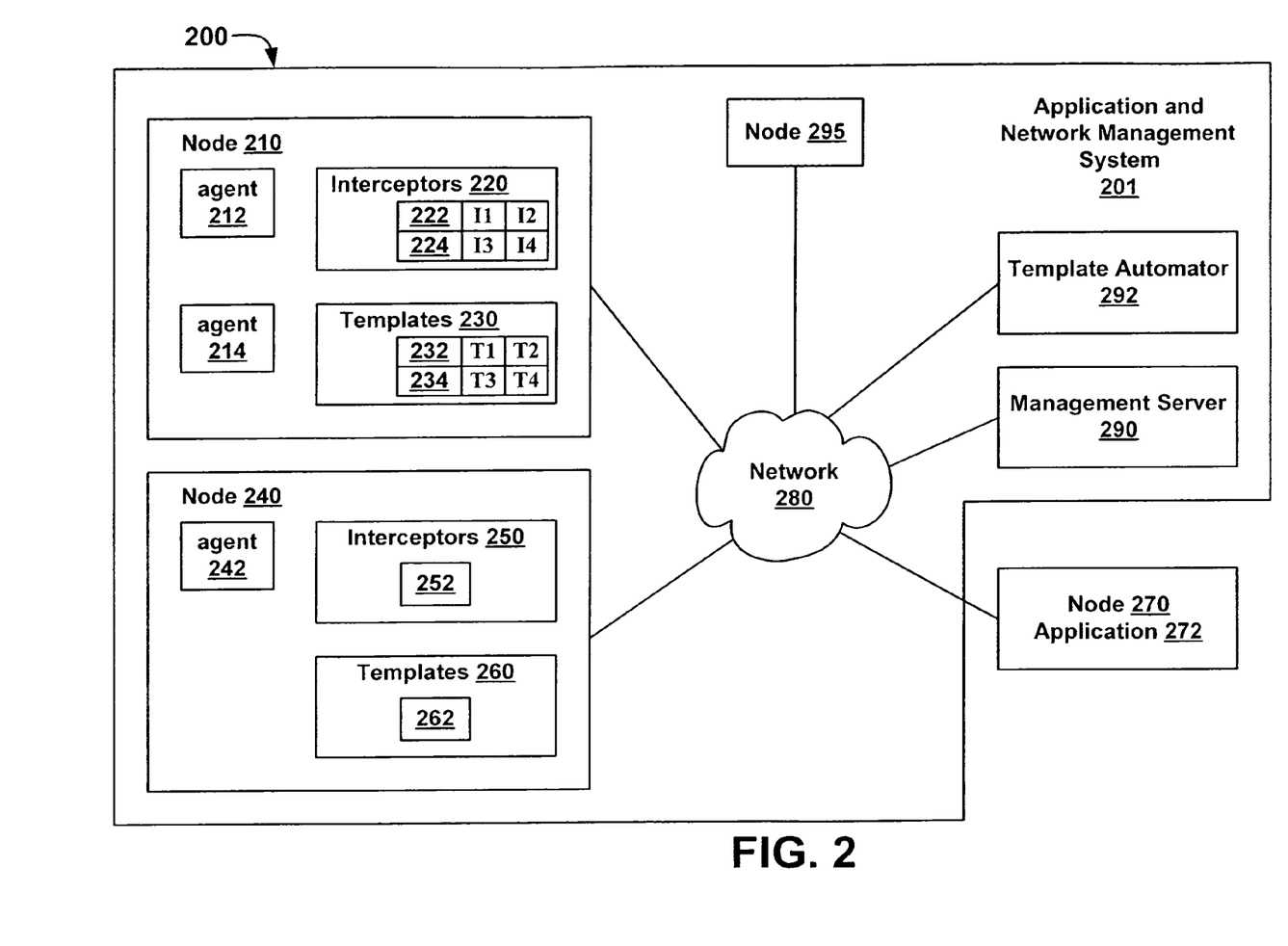
FIG. 2 is a block diagram of an exemplary software system in which embodiments of the present invention can be implemented.

FIG. 2 is a block diagram of an exemplary software system in which embodiments of the present invention can be implemented. The blocks in FIG. 2 can be arranged differently than as illustrated, and can implement additional features that are not described herein.

In the present embodiment, the software system 200 includes a network 280 and nodes (210, 240, 295) that are managed by an application and network management system 201 and a node 270, which is not managed by the application and network management system 201. The application and network management system 201 uses agents (212, 242), interceptors (220, 250), templates (230, 260), and a management server 290, among other things, to manage nodes (210, 240, 295). In the present embodiment, nodes (210, 240) are "operating systems based managed nodes" and node 295 is an example of a "non-operating systems based managed node".

In the present embodiment, applications of the "operating systems based managed nodes" are configured to be agents (212, 214, 242) of the application and network management system 201 by associating interceptors (222, 224, 252) and templates (232, 234, 262) with each of the agents (212, 214, 242). For example, agent 212 is configured with interceptors 222 and templates 232, agent 214 is configured with interceptors 224 and templates 234, agent 242 is configured with interceptors 242 and templates 252. Application 272 is not configured to be an agent of the application and network management system 201.

In the present embodiment, a template automator 292 may either create templates (230, 260), and/or modify existing templates (230, 260) to provide a more secure environment.

In another embodiment, guidelines are described for either creating templates (230, 260), and/or modifying existing templates (230, 260) to provide a more secure environment.

In one embodiment, the templates (232, 234, 262) and interceptors (222, 224, 252) associated with each agent (212, 214, 242) process more than one kind of message. For example, there may be templates for processing messages from opcmsg, SNMP traps, etc., as will be described in more detail. There may be a template T1 for processing opcmsg messages associated with templates 232 and a corresponding interceptor I1 associated with interceptors 222. Similarly, there may be a template T2 for processing SNMP traps associated with templates 232 and a corresponding interceptor 12 associated with interceptors 222. Similarly, there may be templates for processing opcmsg messages (T3) and SNMP traps (T4) associated with templates 234 and corresponding interceptors (I3, I4) associated with interceptors 224.

In one embodiment, the templates 230 associated with a particular node, such as node 210, form a hierarchy of templates. Continuing the example, the console message template and the SNMP trap template of templates 232 may be, respectively, the first and second templates in the template hierarchy. Similarly, a different console message template and a different SNMP trap template of templates 234 may be, respectively, the third and fourth templates in the template hierarchy.

Received messages may be analyzed by each template associated with the hierarchy of templates. Continuing the example, the received message may be analyzed by the first template in the template hierarchy, then by the second template, the third template and finally by the fourth template, thus, the received message may be processed by templates associated with more than one agent, as will be described in more detail.

In one embodiment, the application and network management system 201 is an OVO system, as will be described in more detail.

The nodes (210, 240, 270, 295) and the management server 290 form two and/or three tiers of communication for the management system.

An example of three tier communications involves a node 295, such as a firewall, a load balancer, or a router, that does not run an agent. Assume that node 295 is a router that generates an SNMP trap that will be processed by an SNMP trap interceptor of interceptors 222 and an SNMP trap template of templates 232 associated with agent 212 running on node 210.

Continuing the three tier example, the node 295 generates an SNMP trap, the SNMP interceptor running on node 210 receives the trap and generates a message with the help of the SNMP trap template. The generated message is transmitted to the management server 290 on behalf of node 295. The SNMP trap template may use information from the received SNMP trap to generate the message that is transmitted to the management server 290. In this case, node 295 is the first tier, node 210 running the agent 212 is the second tier and the management server 290 is the third tier.

An example of two tier communications involves a node 210 that runs an agent 212. Assume that an agent 212, such as a database application, on node 210 generates a message with opcmsg, a message interceptor of interceptors 222 on the same node 210 receives the message and possible creates another message that is transmitted to the management server 290. In this case, node 210 running the agent 212 is the first tier and the management server 290 is the second tier.

Attributes

Message attributes are used for associating information with the messages. Examples of attributes include, among other things, severity, node, application, message group, object, and message text. The severity attribute may specify the severity of conditions that resulted in the generation of the messages. The node attribute may specify the nodes that generated the message or that are affected by the message. The message group attribute may specify groups, such as operators or network administrators, which should see the message. The object attribute may be used for categorizing messages. For example, messages generated by a performance monitoring application may have object attributes set to the value "performance". The message text attribute may specify any kind of text that programmers may want to associate with a particular message. The action attribute may specify a request for performing an action.

Interceptors

In one embodiment, application and network management system 201 provides five types of interceptors. The first type is a "message interceptor", for intercepting opcmsg commands or API based messages from an agent. The second type is a "logfile interceptor" for monitoring the system and application logfiles; The third type is an "SNMP trap interceptor" for intercepting SNMP traps that were transmitted to the node running the SNMP trap interceptor (referred to herein as "local SNMP traps") or that were transmitted from a non-operating systems based node (referred to herein as "remote SNMP traps"); The fourth type is a "console message interceptor" for intercepting messages sent to the console; and the fifth type is a "monitor agent interceptor" for monitoring values and/or objects with the help of programs and/or scripts, as will be described herinafter.

Templates

In application and network management system 201, one interceptor for each type of interceptors may be provided to each agent and one template that corresponds to each interceptor is also provided. For example, there may be a message interceptor and a corresponding message template, a logfile interceptor and a corresponding logfile template, etc. for each agent that is managed by a management server in a particular network.

The templates provide the interceptors with instructions on how to analyze and/or process the messages the interceptors receive. For example, the templates typically have, among other things, multiple individual "message conditions". Each message condition may include three sections, a condition section, a set attribute section, and an action section, among other things.

The condition section may be configured with instructions to determine how received messages should be processed. For example, instructions may specify that a received message should not be processed by this template or by any templates after this template in the template hierarchy (referred to hereinafter as "suppressing" the received message). Similarly, instructions may specify that a new message should be created based on the received message.

Additionally, the instructions may specify conditions, such as this message is for "performance", that are "matched" or "unmatched". For example, a received message may be suppressed if the condition is not matched (referred to hereinafter as "suppress on unmatched condition"). In other words, if the received message does not pertain to performance, then suppress the message so that the message is not processed by this template or by any other template in the template hierarchy. In another example, the received message may be suppressed if the condition is matched (referred to hereinafter as "suppress on matched condition"). In other words, if the received message does pertain to performance, then suppress it. In another example, a new message is created if the received message pertains to a specified condition (referred to hereinafter as "message on matched condition"). In other words, if the received message is for performance a new message may be created and information from the received message may be copied into the new message, which may be transmitted to a management server.

The set attribute section may be configured to modify attributes in an existing message or a newly created message. For example, if the received message caused by a particular condition indicates that the criticality of the condition is minor, the set attribute section may modify the criticality to moderate. Similarly, the format of the received message may be modified in the set attribute section. For example, an operator may not understand messages that are generated by a database application. The set attribute section may take the information of a received message, create a new more user-friendly message and map the information of the received message into the new message.

The action section may be configured to specify an action to be performed based on the received message.

Actions

In one embodiment, actions may require operator intervention (referred to hereinafter as "operator initiated actions") or may occur automatically without operator intervention (referred to hereinafter as "automatic actions"). An example of an operator-initiated action may involve a database application running out of space. An operator may be presented a message indicating several possible actions the operator may select from. The operator may select (e.g., initiate) an action that results in backing up the database and in allocating more space to the database.

An example of an automatic action may involve terminating the reception of communications from a network behind a firewall that is failing. This may involve correlating received messages from one or more nodes to determine that the firewall has been intruded. Correlating messages may be performed, for example, on a managed node or a managed server.

Other examples of actions involve requesting trouble tickets or providing notifications, as will be described in more detail.

Trouble Tickets and Notifications

Managing the entities (nodes, agents, etc.) of a management system, sometimes involves requesting that other entities perform certain tasks. Sometimes these other entities are outside of the management system. Trouble tickets may be used for requesting that these tasks be performed.

Continuing the example of the database application running out of space. The database application (e.g., agent) detects and generates a message indicating that the database is running out of space. An interceptor for the database application receives the message. The action section of the template for the interceptor indicates in the newly created message that a trouble ticket should be generated. In the application and network management system 201, the "set forward to trouble ticket" option may be used to set a value in messages communicated to the management server that a trouble ticket should be generated. The newly created message is transmitted to the management server. The management server receives the new message and generates a trouble ticket indicating that a new disk should be allocated to the database. The trouble ticket is then forwarded to another entity, such as a workflow application, that performs tasks required for allocating the new disk.

In another example, notifications may be used for requesting that tasks be performed. An example of a notification, is indicating that an operator should be "notified" by paging the operator. In this case, a request for the notification (e.g., page the operator) may be specified as an action of a message that is transmitted to a management server.

Assigning Templates to Nodes

Nodes are frequently grouped together because they share a level of trust and/or functionality (referred to hereinafter as a "node group"). For example, nodes with a moderate level of trust may be grouped together. In a second example, nodes that are used by a particular department may be grouped together. In a third example, the nodes associated with a distributed database may be grouped together.

Templates are frequently grouped together for the purposes of distributing the templates to nodes (referred to hereinafter as "template groups"). For example, templates for nodes in a distributed database may be grouped together and distributed to the grouped nodes.

Distributing template groups to a particular node or a group of nodes should be approached with caution, as certain aspects that affect security may not be noticed. In one embodiment, template groups are not distributed to node groups, but instead templates are analyzed and distributed individually to particular nodes.

Validation

In one embodiment, various mechanisms may be used for validating information associated with messages to ensure that appropriate actions are performed. These mechanisms may include, among other things, analyzing the messages with programs and/or scripts, analyzing message information with pattern matching language, using environment variables to set and/or analyze attributes of the messages, and using values obtained from secure sources to set and/or analyze attributes of the messages.

Message Stream Interface (MSI) is an example of a product that provides an interface for programs and/or scripts for analyzing messages on behalf of the application and network management system to enhance security. MSI application (i.e. the application using MSI) may be run on either a managed node or on the management server. For example, MSI application installed on node 210 may receive the same message that interceptors 220 receive. Similarly, MSI application installed on a management server 290 may receive messages that interceptors 222 received or other messages that include information from the messages that interceptors 222 received. Further MSI may be run in either "divert" or "parallel" mode. Continuing the example, in parallel mode MSI application and the interceptors 220 both receive identical copies of messages. However, in divert mode MSI application initially receives the message, processes the message and potentially modifies the message, after which the interceptors 220 receive the message. MSI application may prevent the interceptors 220 from receiving messages. Since a malicious user may install MSI application configured in divert mode on a managed node, templates in conjunction with the interceptors have no way of determining whether the messages they receive have been modified. Therefore, in one embodiment, MSI is run in parallel mode on managed nodes.

However, since a malicious user does not have access to management servers, MSI running in divert mode on management servers may be used to provide enhanced security. For example, MSI application running on a management server may intercept a message before the message is processed by management code on the server to validate packet level information in the message against application level data. Examples of application level data include the IP address from the application header. In one embodiment, MSI is run in divert mode on the management server. In one embodiment, MSI is minimally deployed on the management server.

In one embodiment, received messages may be validated by programs and/or scripts, such as those provided by MSI. The invocation of programs/scripts may be specified as an automatic action, for example on a trusted system like a management server, to which the values of message attributes are passed. The programs/scripts may validate the values of the message attributes and retransmit the received messages with an additional attribute that indicates the received messages have been validated.

Environment variables are variables that define the environment of an agent. Examples of environment variables are MSG_GEN_NODE, which is the node that generates a particular message and MSG_GEN_NODE_NAME, which is the name of the node that generated the message. MSG_NODE is the node that is affected by the message and MSG_NODE_NAME is the name of the node that is affected by the message. In the case where the node, such as a proxy server, that generates a particular message forwards the message to another node, the MSG_GEN_NODE will not be identical to the MSG_NODE. Similarly in this case, the MSG_GEN_NODE_NAME will not be identical to the MSG_NODE_NAME.

In one embodiment, environment variables are used for ensuring an action is performed on the node requesting the action. For example, by using the environment variables to specify that an action must be performed on the node that requested the action, a malicious user on one node may not request that harmful actions be performed on another node. Similarly, the environment variables may be used to determine whether a message already specifies that the action will be performed on the node that requests the action.

In another embodiment, environment variables are not trusted in a non-trusted environment. For example, MSI running in divert mode on the management server may be used to determine if the node that generated the message is the same as the node that will be affected by the message. In this case, this may be determined by comparing MSG_GEN_NODE_NAME to MSG_NODE_NAME.

As already stated, frequently received messages include message attributes such as severity, node, application, message group, object and message text. Pattern matching language may be used for analyzing attributes in the condition and the set attributes sections, among other things The pattern matching language of the application and network management system 201 provides pattern matching capabilities such as a wild card for an entire attribute (e.g., "*" ) and a wild card for an individual character (e.g., "@"). For example, "*" may be used to indicate that any value for a particular attribute, such as the node attribute, in received messages is valid. Similarly, "@" may be used to indicate that any character specified in a particular position of received messages is valid.

Other pattern matching capabilities may be used to specify where within a message a comparison should begin. For example, the "^" indicates that a comparison should begin at the start of a message. Similarly, the "$" indicates that a comparison should start at the end of a message. The "nS" indicates the number of spaces that should be skipped before beginning a comparison. For example, 5S indicates that a comparison should begin after 5 spaces from the start of a message.

The pattern matching capabilities "^" and "$" are referred to as anchoring characters because comparisons are anchored to the start or end of a message.

In one embodiment, open pattern matching capabilities such as "*" are not used for analyzing received messages to avoid taking inappropriate actions or correlating messages incorrectly, as will be described in more detail.

In one embodiment, anchoring characters are used to increase the probability that received messages are correctly identified.

In one embodiment, numerical comparison characters of the pattern matching language may be used to validate numerical values associated with received messages.

In one embodiment, non-numerical values, such as keywords, associated with received messages are validated with "@" and/or "nS". For example, the "@" and "nS" may be used to determine if the message text of a received message includes desired keyword values. In this case, the message text of performance related messages may include "CPU utilization=90%", or "CPU utilization=80%", etc., where the percent varies from one performance related message to another. Further the "CPU utilization=" may start at position 13 in a message. The pattern matching language 12S may be used to start a comparison at position 13, where the message is compared against a literal "CPU utilization=". Two "@" signs may be specified after "CPU utilization=" to indicate that any percent is valid.

In one embodiment, non-numerical values associated with received messages may be validated by comparing the non-numerical values against the values of environment variables. For example, MSG_GEN_NODE_NAME and MSG_GEN_NODE may be used to validate the node and/or the object attributes.

In application and network management system 201, a "test pattern matching feature" is provided to determine whether the condition section has been configured properly. Specifically the "test pattern matching feature" validates whether the pattern matching language specified by templates designates the proper message that should be received by that template. In one embodiment, the "test pattern matching feature" is used to validate templates before the templates are distributed to various nodes in the management system.

Values may be obtained from sources that users cannot tamper with, such as application and network management environment variables or a host configuration file. Values obtained from secure sources may be used to set the values of attributes and/or to validate the values of attributes.

Condition Section

As stated before, the templates typically include, among other things, multiple individual message conditions. Message conditions include among other things condition sections.

In one embodiment, the condition section of the "first" message condition is used for determining whether messages received by a particular template should or should not be processed by the particular template and the "last" message condition is used for determining whether the received messages should be processed by other templates in the template hierarchy. For example, the template hierarchy may include templates T1 and T2 where template T1 receives messages before T2. Also assume that template T1 receives messages A and B. The first message condition of template T1 may determine that template T1 will process message A but not message B, thus, message A is processed by template T1 but message B is not processed by template T1. Assume in this example, that template T1 processes message A with "message on matched conditions" to create another message C, copies information from message A into message C and possibly modifies the information in message C in some manner. Then the "last" message condition determines that message A only needs to be processed by template T1 and prevents template T2 from receiving message A.

In one embodiment, the condition section of the "first" message condition determines whether received messages should or should not be processed using "suppress on unmatched condition" logic. For example, if a message B includes an object attribute for "FIREWALL INTRUDED" and template T1's purpose is to process performance messages, the "first" message condition of template T1 may suppress message B because message B does not match the condition "performance".

In one embodiment, the condition section of the "first" message condition may be configured to "suppress on unmatched condition" by not matching the "superset of conditions" from all of the messages that the message template is configured to process. For example, if template T1 is configured to process a message for CPU degradation 80% and another message for CPU degradation 90%, then the "superset of conditions" would be CPU degradation for 80% and also for 90%. Since the "first" message condition suppresses on unmatched conditions, received messages indicating a firewall has been intruded would be suppressed. Similarly, received messages for CPU degradation of 10% and 20% would also be suppressed.

First, suppressing received messages with a "first" message condition reduces the number of messages that the corresponding interceptor will process with the rest of the template. For example, if a message B is suppressed on the "first" message condition of template T1, template T1 will not process message B with logic, such as "message on matched conditions", that follows the "first" message condition. Reducing the number of messages that interceptors process improves overall performance of the network and enhances security of the network, among other things.

Second, suppressing received messages with a "first" message condition reduces the number of unnecessary messages that interceptors for other templates in the template hierarchy will process. For example, if template T1 suppresses message B, then template T2 will not receive message B. Reducing the number of unnecessary messages that interceptors process improves the overall performance of a network and enhances security of the network, among other things.

Third, suppressing received messages with a "first" message condition eliminates the need for redundant filtering on processing logic, such as "message on matched conditions", that follows the "first" message condition. For example, assume that template T1 only processes performance messages but template T1 does not suppress messages that are not for performance in the "first" message condition. In this case, the processing logic that follows the "first" message condition would need to determine if the messages that the logic processes are for performance. If the logic includes several "message on matched conditions", this determination would need to be made on each "message on matched condition". Thus, eliminating the need for redundant filtering on each "message on matched condition" improves overall performance of a network. Since logfiles typically contain large amounts of data that requires a lot of parsing, eliminating redundant filtering on each "message on matched condition" of a logfile template results in a significant performance increase, among other things.

Fourth, suppressing received messages with "first" message condition eliminates the possibility that new messages may be erroneously created, for example in "message on matched conditions" that specify improper open conditions, such as a "*" for a target node. In another example, template T1 may receive a message C that is not related to performance and may create another message D using information from message C. Eliminating the erroneous creation of messages enhances the overall performance of a managed system and significantly improves the security of the managed system, among other things.

Fifth, suppressing received messages with a "first" message condition eliminates erroneous actions. For example, a request for an erroneous action (such as requesting that a management server create a trouble ticket) may be appended to message D. Eliminating erroneous actions improves the security of a managed system, among other things.

In one embodiment, the condition section of the "first" message condition is configured to suppress on unmatched condition in at least the message, logfile, SNMP trap, and console templates.

In one embodiment, the condition section of the "last" message condition is configured to "suppress on matched condition" messages that are processed by a particular template, provided the messages do not also need to be processed by other templates in the template hierarchy. For example, if received message A only applies to template T1, and template T1 does not suppress message A after processing message A, template T2, which comes after template T1 in the template hierarchy, will receive message A.

In one embodiment, the condition section of the "last" message condition may be configured to "suppress on matched condition" by matching the "superset of conditions" from all of the messages that the template is configured to process. Continuing the previous example of the "superset of conditions" being CPU degradation of either 80% or 90%: The condition section of the "last" message condition would suppress all messages for CPU degradation of either 80% or 90% after processing the messages for CPU degradation of 80% and 90%.

First, suppressing received messages with a "last" message condition of a particular template eliminates the possibility that other templates in the template hierarchy will erroneously process the messages. For example, if template T1 suppresses message A after processing message A, template T2 will not receive message A. Eliminating the possibility that other templates will erroneously process the messages improves overall performance of a network and enhances security of the network, among other things.

Similarly, since logfiles typically include large amounts of information, reducing the number of messages the logfile interceptors process greatly improves the performance of logfile interceptors.

Second, suppressing received messages with a "last" message condition of a particular template eliminates the possibility that other templates in the template hierarchy may erroneously create new messages in "message on matched conditions". Continuing the example of template T2 receiving message A after template T1 fails to suppress message A. If template T2's filtering rules are mis-configured or specify improper open conditions, T2 may incorrectly identify message A as a message T2 should process in some manner. One way T2 may process message A is by creating another message B and transmitting message B to the management server, for example with a "message on matched condition". A "message storm" may result if enough messages are incorrectly created and transmitted. Not only does the incorrect creation and transmission of messages degrade the overall performance of the network, but security is also degraded, as unwanted actions may occur. By reducing the incorrect creation and transmission of messages, the usability and the availability of a network also increases.

In one embodiment, the condition section of the "last" message condition is configured to suppress on matched condition in at least the message, logfile, SNMP trap, and console templates.

In one embodiment, templates only suppress messages from the agents that the templates correspond to. For example, if template T1 corresponds to a particular performance monitoring application, the template T1 would only suppress messages in the "first" and "last" message condition for that performance monitoring application. One way of doing this is to check the value of the application attribute for the received messages.

In one embodiment, the condition section uses pattern matching language to identify received messages. For example, pattern matching language may be used in the "first" message condition to determine if received messages specify conditions that do not match the conditions specified by the pattern matching language; therefore, the received messages are suppressed. Similarly, pattern matching language may be used in "message on matched conditions" to determine if the received messages specify conditions that match conditions specified by the pattern matching language; therefore, new messages are created. Thirdly, pattern matching language may be used in the "last" message condition to determine if messages that have been processed specify conditions that match conditions specified by the pattern matching language; therefore, the processed message are suppressed.

In one embodiment, the pattern matching language is used against the received messages' message text as the message texts may be specific to each message. The values for attributes such as node, application, and node group, may be the same for messages that pertain to many templates; therefore, these attributes may be used in the "first" message conditions to suppress messages on unmatched condition, but, may not be sufficient for determining whether to create new messages with "message on matched conditions".

In one embodiment, the pattern matching language is used to analyze the object attribute of received messages as the object attribute may be specific to a category of messages that are processed by particular templates. For example, a performance monitoring agent may produce a category of messages that have an object attribute set to "performance". Pattern matching language for a template associated with the performance monitoring agent may be used to determine whether received messages include an object set to the value "performance".

Set Attributes Section

In the application and network management system 201, the "message on matched conditions" provides a set attributes section for message correlation and for setting some attributes associated with messages.

In the application and network management system 201, if the set attribute section does not provide specific values for message attributes, attributes for the messages created by the "message on matched condition" are automatically set to values from received messages (referred to hereinafter as "input values").

In one embodiment, the input values are only used for setting the attributes of created messages after the input values have been properly validated, using mechanisms as described in the "Validation" section herein, among other things.

In one embodiment, the set attribute section is not left empty. For example, specific values, that have been properly validated as already described herein, are assigned to the attributes of the created messages.

In one embodiment, attributes specifying keywords are used for determining whether the received messages are related (also known as "correlating" messages). Special care should be given to understanding these keywords to ensure that messages are properly correlated. For example, a keyword for "firewall intrusion" is not related to a keyword for "performance". However, a keyword for "CPU degradation" may be related to a keyword for "performance". Further, it is important to use related keywords in templates associated with all managed nodes. For example, if a template that monitors performance on node A sets message text attributes to "CPU degradation" and a template that monitors performance on node B incorrectly sets message text attributes to "xyz", the management server will probably not determine that the messages from both node A and node B are performance related.

In one embodiment, application and network management environment variables environment variables are used for setting the values of attributes in the set attribute section. For example, a malicious user may easily set the values of the object and node attributes. Therefore environment variables may be used for setting the values of the object and node attributes in the set attributes section.

Special attention should taken when setting the severity and message group attributes, as mis-configuring these attributes impairs security and may result in message storms.

For example, modifying the severity of a message from minor to critical may result in a false alarm. Similarly, modifying the security group may result in inappropriate actions being taken as the wrong people may see the message.

The set attributes section may be used to modify the format of messages, as already described herein.

Action Section

Typically, in the application and network management system 201, the action section may log information from received messages in a history log or configure messages with actions that a management server performs when it receives the configured messages. A message may be configured with an action by specifying in a command attribute of the message an action that should be performed. The command attribute may indicate, for example, that a trouble ticket should be generated by a management server or that someone should be notified to perform some task.

The configured message may be transmitted to the management server where the configured message may be analyzed with the help of a script and/or program. In this case, the configured message may include information for locating the script and/or program, such as the path name of the script and/or program. The script and/or program may analyze the values of attributes associated with the configured message to help the management server determine how the action should be performed. For example, the script and/or program may determine the target node that the action should be performed on. Similarly, the script and/or program may determine whether the action should be performed automatically or whether the action involves operator involvement. In one embodiment, the script and/or program validates messages by comparing the values of the received messages' attributes against the values of environment variables and/or variables from secure sources.

In one embodiment, information for locating scripts and/or programs specify the full path name of the scripts and/or programs. For example, the configured message would include the full path name of the script and/or program rather than just the a relative path name of the script and/or program, thus, preventing scripts/programs residing in a different directory from gaining access to the configured message.

Some received messages do not request actions to be performed. In this case, the management server may not be informed of the contents of the received message. For example, templates may or may not be configured with an "on server log only" option. Templates configured with "on server log only" notify management servers of received messages that do not request actions and therefore the management servers only need to log. Templates that are configured with the "on server log only" option, notify the management server when they receive messages that do not request actions. However, templates that are not configured with the "on server log only" option do not notify the management server when they receive messages that do not specify requests for actions. In one embodiment, management servers are notified of data associated with message even when the messages do not specify requests for actions.

In one embodiment, the node attribute indicating where an action will be performed is always specified by an action section. If the node attribute is not specified in the action section, the node indicated in the received message may be used. Since a malicious user may specify the node in a message received by a template, actions should not be performed on the node specified by a received message.

In one embodiment, the identification of a node that actions are performed on are hard coded by the action section into messages. For example, the action section of a particular template may hard code the name of nodes into messages processed by the action section, thus, ensuring what nodes actions are performed on.

In an alternative embodiment, variables that are local (referred to hereinafter as "local variables") to a particular template may be used for specifying the node that actions are performed on. In one embodiment, the values of the variables may be validated. For example, the local variables may be compared against environment variables or variables from secure sources.

In one embodiment, environment variables may be used for specifying the node that actions are performed on. For example, MSG_NODE may be used for specifying the node that actions are performed on. In this case, templates may be written in a generic manner and distributed to many nodes, as the environment variables are initialized with values that pertain to the node the template resides on.

In one embodiment, a command attribute indicating what action will be performed is always specified by the action section. Specifying the action in the action section prevents malicious users from directly or indirectly causing a request for an action to be appended to a message, among other things.

In one embodiment, variables that are local to a particular template may be used for specifying values associated with the command attribute. In one embodiment, the values of the local variables may be validated. For example, the variables may be compared against environment variables or variables from secure sources.

In one embodiment, environment variables may be used for specifying values associated with the command attribute.

In one embodiment, variables are validated by a script and/or program, as already described herein, before being used to specify values for the command attribute.

Various scripts and/or programs on management servers may be invoked as the result of actions being performed. Frequently, different groups of people develop the templates and the scripts/programs. Attributes, such as the object attribute, may be used to pass values to the scripts/programs. In one embodiment, the attributes, which the scripts/programs use, may be analyzed to determine whether the condition sections and/or the set attributes sections of templates should be modified to provide more validation of attributes. For example, templates may validate attributes in the condition section that scripts/programs rely on by comparing the attributes to the values of environment variables or variables from secure sources before the scripts/programs receive the attributes. Similarly, the template may use environment variables or variables from secure sources to set the values of attributes before the scripts/programs receive the attributes.

SNMP

In one embodiment, SNMP trap templates specify the nodes that actions are performed on, since SNMP traps are typically issued from nodes which provide little or no security. For example, SNMP traps are typically issued without password protection or from non-managed nodes, which do not provide security with an agent executing on the nodes. In one embodiment, trap templates may specify the nodes that actions are performed on by specifying the nodes' Internet Protocol (IP) addresses and/or the nodes' Domain Space Names (DSNs). For example, if the node is not managed by a management system, the IP address and/or the DSN may be used to identify the node.

Automation

In one embodiment, configuring templates is automated. For example, a person, such as a network administrator, may use a generalized user interface (GUI) for a template automator 292 to specify one or more templates to be configured and select a feature of the GUI to cause the templates to be configured.

In one embodiment, a template automator analyzes templates to determine whether the templates provide network security and modifies the templates to enhance their level of security. In one embodiment, the template automator analyzes the template's message processing logic to determine what messages the template should suppress. For example, the template automator 292 may analyze the "message on matched conditions" in a particular template to determine the "superset of conditions" for the "message on matched conditions" in that template. The template automator 292 may use the "superset of conditions" from the "message on matched conditions" to modify the template to have a "first" message condition that "suppresses on unmatched condition" where the condition in the "suppress on unmatched condition" is the "superset of conditions". Similarly, the template automator 292 may use the "superset of conditions" to modify the template to have a "last" message condition that "suppresses on matched condition" where the condition in the "suppress on matched condition" is the "superset of conditions".

In one embodiment, a template automator may modify open conditions in templates to be specific conditions. For example, the template automator 292 may analyze templates to determine if the templates specify "*" when checking the node attribute in received messages. The template automator 292 may modify the templates to use environment variables, such as MSG_NODE_NAME, hard coded names, IP addresses, and/or DSNs, instead of "*". Similarly, the template automator 292 may modify templates to specify that actions may be performed on specific nodes.

In one embodiment, a template automator may modify templates based on rules. For example, a network administrator may specify rules for modifying templates. Examples of rules may include what actions may be performed remotely and what nodes these remote actions may be performed on. The rules may specify whether templates using open conditions to analyze messages should be modified to instead use, among other things, environment variables, hard coded values, etc.

In one embodiment, a template automator analyzes existing templates and re-configures the templates. In one embodiment, a template automator creates new templates rather than re-configuring existing templates. In one embodiment, the template automator distributes templates after they have been created and/or re-configured.

Additional Considerations

Even users with little or no privileges may cause actions to be performed by issuing messages, for example with opcmsg, opcmon, and/or an API, among other things. One way of protecting systems against dangerous remote actions (such as causing the deletion of directories on a node the user has little or no privileges on) is to prevent actions from being performed remotely, as already described herein. However, in some situations remote actions may be very useful. Remote actions may be allowed provided extra security is provided in a system to ensure that the remote actions are not dangerous and are performed on appropriate nodes.

In one embodiment, the authorization of remote actions may be provided by MSI application. In this case, MSI application may be configured with a file in a standard or proprietary format and integrated with an overall security policy application. MSI application may be installed and configured on both managed nodes (optionally) and/or management servers, as already described herein.

In another embodiment, the authorization of remote actions may be provided explicitly by specifying in templates what nodes actions may be performed on, as already described herein. In one embodiment, the authorization of remote actions may be enhanced by explicitly specifying in templates what actions may be performed. For example, the actions may be specified in the action section in the form of a "list of actions" that are allowed. In one embodiment, the authorization of remote actions may be enhanced by verifying actions specified in an action attribute of a message with pattern matching language. For example, the action attributes may be verified by a list of instructions with pattern matching language for determining if the action attributes specify authorized remote actions.

Advanced Options

In one embodiment, default settings are used for advanced options in the application and network management system 201. In one embodiment, the following two options are not used. First, MSI is not run in divert mode on a managed node. Second, the "enable message with local automatic actions with send when action finished" option is not set. For example, some actions, such as logfile rotation, are performed automatically and locally on a node. If the "enable message with local automatic actions with send when action finished" option is set, the management server is not notified of actions that are performed automatically and locally on a node.

An Operational Example

Figure 3:
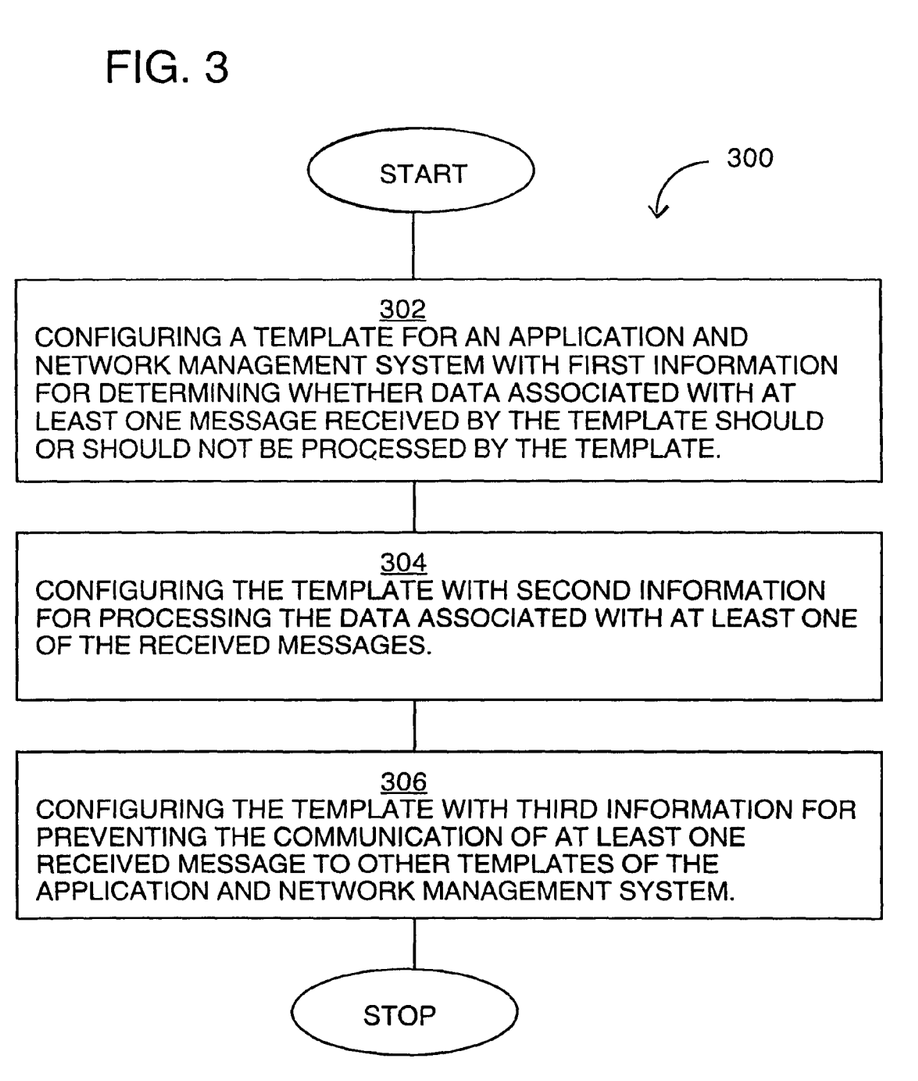
FIG. 3 depicts a flowchart for configuring templates according to embodiments of the present invention.

FIG. 3 depicts flowchart 300 for configuring templates according to embodiments of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. All of, or a portion of, the embodiments described by flowcharts 300 can be implemented using computer-readable and computer-executable instructions which reside, for example, in computer-usable media of a computer system or like device. In the present embodiment, steps depicted in flowchart 300 may be implemented by the template automator 292 of FIG. 2. In the present embodiment, the template automator 292 may be executed on the computer system 190.

For the purposes of illustration, the following discussion of flowchart 300 shall refer to structures depicted in FIG. 2 and to exemplary instructions depicted in Table 1 below. Referring to FIG. 2, for the purposes of illustration assume that agent 212 is a performance monitoring application called perfmon 212, that a template T1 of templates 232 includes the instructions depicted in Table 1, and that an interceptor I1 of interceptors 222 uses template T1 to process performance related messages generated by perfmon 212 using opcmsg.

Referring to FIG. 2, for the purposes of illustration assume that agent 214 is a billing application called billapp 214, that an interceptor I3 of interceptors 224 uses template T3 to process billing messages generated by billapp 214 using opcmsg. In this example, I1 and I3 are message interceptors. Similarly, T1 and T3 are message templates.

Referring to Table 1, for the purposes of illustration, assume the instruction 1 depicts a "first" message condition, that instructions 2 and 3 depict "message on matched conditions" for generating new messages when the specified conditions are matched, and that instruction 4 depicts a "last" message condition.

TABLE 1

Exemplary instructions of a template

| Instruction No. | Instructions |
|---|---|
| 1 | For messages generated by application perform, suppress received messages that are not for conditions:<br>Object = performance or<br>Message text = CPU degradation of 80% or<br>Message text = CPU degradation of 90%. |
| 2 | Generate a new message if received message is for conditions:<br>Object = performance and<br>Message text = CPU Degradation of 80%. |
| 3 | Generate a new message if received message is for conditions:<br>Object = performance and<br>Message text = CPU Degradation of 90%. |
| 4 | For messages generated by application perfmon, suppress messages that are for conditions:<br>(Object = performance and Message text = CPU Degradation of 80%) or<br>(Object = performance and Message text = CPU Degradation of 90%). |

As depicted in Table 1, instructions 1 and 4 only suppress messages generated by application perfmon 212, thus, messages generated by other applications, such as billapp 214, may be processed by the interceptors and templates that correspond to the other applications, such as I3 and T3.

In step 302 of FIG. 3, a template for a application and network management system is configured with first information for determining whether data associated with at least one message received by the template should or should not be processed by the template. For example, template T1 may be configured with instructions of Table 1 for suppressing messages generated by application perfmon 212 that are not for "performance", "CPU degradation of 80%", or "CPU degradation of 90%". When perfmon 212 generates a message A including an object attribute set to "performance" and a message text attribute set to "CPU degradation of 80%", the interceptor I1 uses instruction 1 to determine that the data from message A should be processed by instructions 2, 3, and 4 of template T1 as depicted in Table 1.

Similarly, when perfmon 212 generates a message B including a message text attribute set to "CPU degradation of 10", interceptor I1 uses instruction 1 to determine that the data from message B be suppressed. Therefore, instructions 2, 3, and 4 will not process message B and interceptor I3 will not receive message B.

In yet another example, if billapp 214 generates a message C including an object attribute set to "billing", the interceptor I1 uses instruction 1 to determine that the interceptor I1 is not going to suppress message C, thus, interceptor I3 receives message C.

In step 304, the template is configured with second information for processing data associated with at least one received message. For example, template T1 may be configured with instructions 2 and 3 of Table 1. When interceptor I1 uses instruction 2 for generating a new message for "performance" and "CPU Degradation of 80%", a message E may be created. Message E may include data from message A, such as the object is "peformance" and the message text is "CPU Degradation is 80%". Similarly, additional attributes of message E may be set. For example, a severity attribute associated with message E may be set to "critical". Message E may be transmitted to management server 290.

In step 306, the template is configured with third information for preventing the communication of at least one received message to other templates of the application and network management system. Continuing the example, template T1 may be configured with instruction 4 of Table 1 for suppressing messages generated by application perfmon 212 that are for "performance" and "CPU degradation of 80%" or for "performance" and "CPU degradation of 90%". Since, message A has an object attribute set to "performance" and a text attribute set to "CPU Degradation of 80%", interceptor I1 may use instruction 4 to suppress message A, thus, interceptor I3 will not receive message A.

Concslusion

By configuring the "first" and "last" message conditions as described herein, the creation and/or processing of erroneous messages is prevented, thus, security is provided, overall performance of the network is increased, and performance of interceptors is increased.

Proper validation of messages using secure sources, pattern message language, environment variables, and MSI, not only prevents the creation and/or processing of erroneous messages but also provides application and network security.

By preventing the creation and/or processing of erroneous messages, the usability and the overall robustness of an application and network management system is increased.

Extensions and Alternatives

Although certain embodiments of the present invention were described using the application and network management system 201, the present invention is not limited to the application and network management system 201. For example, any mechanism for managing entities, such as nodes and/or agents associated with a network, which analyzes messages to and/or from those entities, may use embodiments described herein.

Embodiments of the present invention are thus described. While the present invention has been described in particular embodiments, it should be appreciated that the present invention should not be construed as limited by such embodiments, but rather construed according to the following claims.

What is claimed is:

1. A method for configuring templates, the method comprising:
configuring, at a computer system, a template for an application and network management system with first information for determining whether data associated with at least one message received by the template should or should not be processed by the template;
configuring, at the computer system, the template with second information for processing the data associated with the at least one message; and configuring, at the computer system, the template with third information for preventing a communication of the at least one message to other templates of the application and network management system.

2. The method of claim 1, wherein configuring the template with second information for processing further comprises configuring the template with the second information for communicating the data associated with the at least one message to a management server.

3. The method of claim 1, wherein the template is one of an SNMP trap template, a message template, a monitor agent template, a logfile template and a console template.

4. The method of claim 1, wherein the at least one message is validated with at least one of pattern matching language, MSI, values from environment variables, and values from secure sources.

5. The method of claim 1, wherein the method further comprises:
configuring the template with fourth information for specifying for a particular received message an action to be performed, wherein the fourth information ensures that the action is performed on a node that generated the particular received message.

6. The method of claim 1, wherein the second information specifies a superset of conditions for processing all the received messages and wherein:
configuring the template with the first information further comprises configuring the template with the superset of conditions to determine whether data associated with the at least one message should or should not be processed by the template; and
configuring the template with the third information further comprises configuring the template with the superset of conditions to prevent the communication of the at least one message to other templates.

7. The method of claim 1, wherein the steps of configuring are performed by a template automator.

8. A method for providing a guideline to developers for creating templates, the guideline comprising information used by the developers for:
receiving, at a computer system, first information entered by a developer to configure a template of an application and network management system for determining whether data associated with at least one message received by the template should or should not be processed by the template;
receiving, at the computer system, second information entered by the developer to configure the template to process the data associated with the at least one message;
receiving, at the computer system, third information entered by the developer to configure the template to prevent a communication of the at least one message to other templates of the application and network management system;
determining, at the computer system, the guideline for an action for the template regarding the at least one message wherein the determining is based on the first information, the second information and the first information; and
providing the guideline to the developers.

9. The method of claim 8, wherein second information to process the data further comprises the second information to communicate the data associated with at least one of the received messages to a management server.

10. The method of claim 8, wherein the template is one of an SNMP trap template, a message template, a monitor agent template, a logfile template and a console template.

11. The method of claim 8, wherein at least one received message is validated with at least one of pattern matching language, MSI, values from environment variables, and values from secure sources.

12. The method of claim 8, wherein the method further comprises:
receiving fourth information entered by the developer to configure the template to specify an action for a particular received message, wherein the fourth information ensures that the action is performed on a node that generated the particular received message.

13. The method of claim 8, wherein the second information specifies a superset of conditions for processing all the received messages and wherein:
receiving the first information further comprises configuring the template with the superset of conditions to determine whether data associated with the at least one message should or should not be processed by the template; and
receiving the third information further comprises configuring the template with the superset of conditions to prevent the communication of the at least one message to other templates.

14. A computer-usable storage medium having instructions embodied therein that when executed cause a computer system to perform a method for configuring templates, the method comprising:
configuring a template for an application and network management system with first information for determining whether data associated with at least one message received by the template should or should not be processed by the template;
configuring the template with second information for processing the data associated with the at least one message; and
configuring the template with third information for preventing a communication of the at least one message to other templates of the application and network management system.

15. The computer-usable storage medium of claim 14, wherein the configuring the template with second information for processing further comprises configuring the template with the second information for communicating the data associated with at least one of the received messages to a management server.

16. The computer-usable storage medium of claim 14, wherein the template is one of an SNMP trap template, a message template, a monitor agent template, a logfile template and a console template.

17. The computer-usable storage medium of claim 14, wherein the at least one message is validated with at least one of pattern matching language, MSI, values from environment variables, and values from secure sources.

18. The computer-usable storage medium of claim 14, further comprising:
configuring the template with fourth information for specifying for a particular received message an action to be performed, wherein the fourth information ensures that the action is performed on a node that generated the particular received message.

19. The computer-usable storage medium of computer system of claim 14, wherein the second information specifies a superset of conditions for processing all the received messages and wherein:

configuring the template with the first information further comprises configuring the template with the superset of conditions to determine whether data associated with the at least one message should or should not be processed by the template; and configuring the template with the third information further comprises configuring the template with the superset of conditions to prevent the communication of the at least one message to other templates.

\* \* \* \* \*

UNITED STATES PATENT AND TRADEMARK OFFICE
CERTIFICATE OF CORRECTION

| | |
|---|---|
| PATENT NO. | : 8,065,368 B2 |
| APPLICATION NO. | : 10/632446 |
| DATED | : November 22, 2011 |
| INVENTOR(S) | : Amit Raikar et al. |

It is certified that error appears in the above-identified patent and that said Letters Patent is hereby corrected as shown below:

In column 23, lines 1-2, in Claim 19, after "medium of" delete "computer system of".

Signed and Sealed this
Fifteenth Day of January, 2013

David J. Kappos
*Director of the United States Patent and Trademark Office*